United States Patent [19]  
Maples

[11] Patent Number: 4,833,281  
[45] Date of Patent: May 23, 1989

[54] MOTION DETECTOR
[75] Inventor: David T. Maples, Clarkston, Mich.
[73] Assignee: Lectron Products, Inc., Rochester Hills, Mich.
[21] Appl. No.: 200,019
[22] Filed: May 27, 1988
[51] Int. Cl.⁴ .......................................... H01H 35/14
[52] U.S. Cl. ........................... 200/61.45 R; 200/61.52; 200/DIG. 29
[58] Field of Search ................ 200/61.45 R, 61.45 M, 200/61.52, 61.53, DIG. 29, 276, 277, 292

[56] References Cited  
U.S. PATENT DOCUMENTS

| | | | |
|---|---|---|---|
| 3,163,856 | 12/1964 | Kirby | 340/526 |
| 3,594,748 | 7/1971 | Grotjahn | 340/534 |
| 3,999,177 | 12/1976 | Greene | 340/575 |
| 4,001,185 | 1/1977 | Mitsui et al. | 200/61.45 M X |
| 4,016,401 | 4/1977 | Delaage | 200/DIG. 29 X |
| 4,196,429 | 4/1980 | Davis | 340/669 |
| 4,234,876 | 11/1980 | Murai | 340/573 |
| 4,292,630 | 9/1981 | Dumont | 340/573 |
| 4,580,136 | 4/1986 | Kitamura et al. | 340/825.31 |
| 4,628,160 | 12/1986 | Canevari | 200/61.45 R |
| 4,766,275 | 8/1988 | Hemmann et al. | 200/277 X |

Primary Examiner—J. R. Scott  
Attorney, Agent, or Firm—Harness, Dickey & Pierce

[57] ABSTRACT

A motion detector particularly adapted for use with the transmitter of a motor vehicle keyless entry system. The motion detector causes the transmitter device carried by the user to transmit a coded signal when it is in motion, for example, as it is being carried by a user toward the vehicle. The motion detector includes a spool surrounded by and electrically insulated from a shell. A ball is positioned in the annular cavity around the spool. Associated electronics are provided to sense a change in state of the motion detector as an indication of motion. Changes of state of the motion detector occur when the ball moves into and out of direct contact with the spool or shell and further as the ball rolls around the annular cavity while being supported by both the spool and shell caused by surface roughness of the interface surfaces.

4 Claims, 1 Drawing Sheet

MOTION DETECTOR

BACKGROUND AND SUMMARY OF THE INVENTION

This invention relates to a motion detector and particularly to such a detector for incorporation into an electronic device which detects movement of an individual carrying the device.

As a means of increasing the convenience of entering a locked motor vehicle, many designs for so-called keyless entry systems have been proposed. Such systems would enable the vehicle to be unlocked without requiring the user to employ a conventional key-type locking system. One approach is to provide an external keypad on the motor vehicle through which the user inputs a code to unlock the vehicle. Although such systems eliminate the need for using a conventional key, they nonetheless require the user to take time to manually input the code before being able to enter the vehicle.

Another approach is to provide an electronic device carried by the user which can be activated when in close proximity to the vehicle to emit a coded signal which is processed by a receiver in the vehicle to unlock the vehicle. The transmitter/beacon device carried by the user could be activated by a pushbutton or other means. In order to provide a totally passive keyless entry system, the transmitter could be controlled to emit a unique coded signal on a continuous basis. Although this approach is advantageous in that no action is required by the user, it could lead to unacceptable high drain of the internal power source of the transmitter. In order to converse battery drainage, a motion detector can be incorporated into the transmitter which senses movement such as occurs when an individual is walking toward their vehicle. The motion signal is then used to activate the transmitter causing it to emit its coded signal. When the transmitter and its internal motion detector are at rest, for example, when the user having the device is sitting quietly or while it is stored temporarily, the transmitting circuit can be turned to an off or quiescent state thereby eliminating or reducing battery drain to the micropower range. In order for such a motion detector to perform satisfactory, it must detect extremely low levels of acceleration in all orientations as would be expected when a user is carrying the transmitter in their pocket. Moreover, such a motion detector should be easy to assemble, employ few parts, and feature low cost materials and construction.

A motion detector achieving the above-mentioned desirable features is provided according to this invention. The motion detector includes a spool-shaped conductor which is surrounded in a clearance relationship by a cylindrical conductive shell. A conductive ball is trapped within the annular space around the spool. When the ball is moved into and out of contact with the spool and shell, an interrupted electric signal is provided which signals movement. In addition, one or more of the contacting surfaces of the motion detector can be intentionally roughened so that movement of the ball while remaining in physical contact with the two electrodes will cause an interrupted current condition through the switch which is interpreted as movement. Both the spool and outer cylindrical shell can be mounted directly to a printed circuit (PC) board for convenient mounting and assembly.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
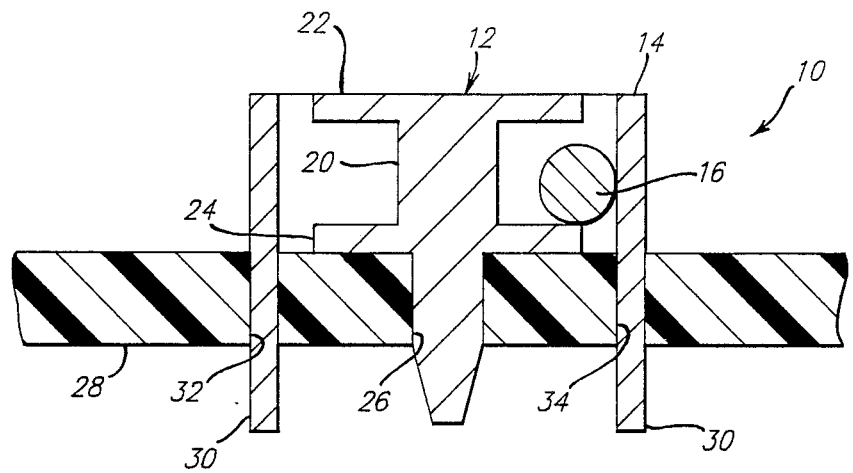
FIG. 1 is a side cross-sectional view of the motion detector according to this invention showing the contact ball contacting both the spool and shell contact surfaces thus creating a closed circuit condition.
Figure 2:
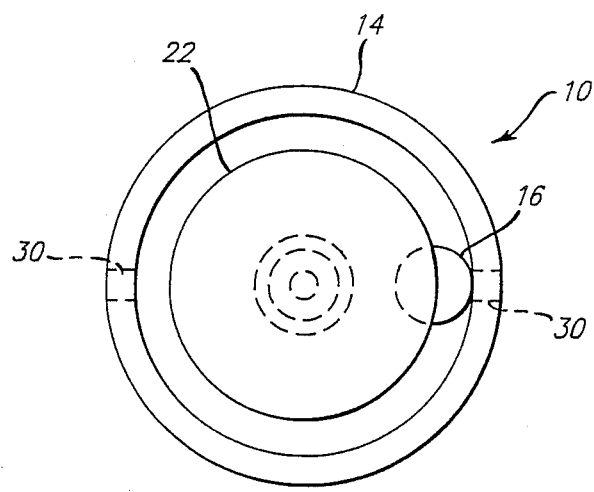
FIG. 2 is a top view of the motion detector shown in FIG. 1.

A motion detector in accordance with this invention is shown in FIGS. 1 and 2 and is generally designated by reference number 10. Motion detector 10 principally comprises spool 12, shell 14 and ball 16.

As shown in the figures, spool 12 has a center post 20 with a pair of axially separated, radially projecting flanges 22 and 24. The lowermost end of post 20 is adapted to fit within hole 26 of PC board 28. Shell 14 surrounds spool 12 and is electrically insulated and separated from the spool. Shell 14 has a pair of projecting mounting and terminal posts 30 which pass through holes 32 and 34 in PC board 28. Ball 16 is dimensioned to move freely within the annular space between flanges 22 and 24. Spool 12 and shell 14 act as the poles of a switch with ball 16 acting to close or open the switch.

The materials making up spool 12, shell 14 and ball 16 should be the same to avoid the creation of an electrical source produced by the contact of materials with different electromotive forces. A large difference in electromotive force increases the corrosion likelihood of the contacting surfaces. Obviously, the materials making up the component should be a good conductor and, furthermore, oxides produced by the material should also be a good conductor. Since it is essential that ball 16 move freely within spool 12, the materials should not be magnetic or easily magnetized. Brass is a good material to be used for each of the motion detector components since it exhibits the above-mentioned desirable properties.

The motion detector 10 is designed to be opened and closed in two different manners. The first and most apparent way is through forces generated by motion of the detector causing ball 16 to separate from either one or both of the spool 12 and shell 14 surfaces thereby opening the switch. The second mechanism for changing the state of the switch occurs when ball 16 rolls freely inside the annular cavity of spool 12 while remaining supported by both the spool and shell 14. Imperfections of the interface surfaces either from machining or by intentionally adding surface roughness during manufacture, coupled with the movement of ball 16 will momentarily open and close the switch. Any or all of the contacting surfaces, including the inside surfaces of flanges 22 and 24, the inside surface of shell 14, and the outside surface of ball 16 could be roughened in this manner. In order to enable such interruptions in the switch to occur, a low applied voltage should be used, for example, less than twelve volts DC which does not have a great tendency to arc across even minute separations between contact. For a ball 16 having a diameter of 0.062 inch, it was found that roughness of the inside surface of shell 14 of at least 125 microinch with three volts DC applied across detector 10 provided acceptable operation.

The electronics connected to motion detector 10 cannot merely sense an open circuit condition as indicative of movement since it is possible that when at rest, ball 16 could be out of contact with shell 14. The electronics must detect a change in state, i.e., open to short, or short to open condition as an indication of motion.

While the above description constitutes the preferred embodiments of the present invention, it will be appreciated that the invention is susceptible to modification, variation and change without departing from the proper scope and fair meaning of the claims.

What is claimed is:

1. A motion detector comprising:
   a spool made of an electrically conductive material having a center post with a pair of axially separated radially projecting flanges,
   a shell made of an electrically conductive material surrounding said spool and electrically insulated from said spool,
   a ball made of an electrically conductive material disposed in the annular space surrounding said spool post and between said flanges, and
   electrical terminals connected to said spool and said shell and wherein changes in the open or closed circuit condition across said terminals caused by said ball separating from mutual contact with said spool and said shell or caused by said ball rolling about said annular cavity while physically supported by said spool and shell provides an indication of movement of said motion detector.

2. A motion detector according to claim 1 wherein at least one of said flanges, said shell and said ball have a surface roughness of greater than 125 microinches to cause a change in open or closed conditions of said detector as said ball rolls around said annular cavity while physically supported by said spool and said shell.

3. A motion detector according to claim 1 wherein said spool, said shell and said ball are made from brass.

4. A motion detector according to claim 1 wherein said electrical terminals are integral with said spool and said shell and protrude therefrom to enable said spool and said shell to be mounted to a printed circuit board.

* * * * *